(12) United States Patent
Sachara

(10) Patent No.: US 10,119,603 B2
(45) Date of Patent: Nov. 6, 2018

(54) TORQUE CONVERTER INCLUDING FRONT COVER FLUID FLOW BAFFLES

(71) Applicant: Schaeffler Technologies AG & Co. KG, Herzogenaurach (DE)

(72) Inventor: Gary Sachara, Brunswick, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 208 days.

(21) Appl. No.: 15/171,497

(22) Filed: Jun. 2, 2016

(65) Prior Publication Data

US 2017/0350488 A1    Dec. 7, 2017

(51) Int. Cl.
*F16H 41/28*    (2006.01)

(52) U.S. Cl.
CPC ....... *F16H 41/28* (2013.01); *F16H 2041/285* (2013.01)

(58) Field of Classification Search
CPC ................................................. F16H 2041/243
USPC .................................................... 60/330, 364
See application file for complete search history.

(56) References Cited

U.S. PATENT DOCUMENTS

| | | | | |
|---|---|---|---|---|
| 4,867,641 A * | 9/1989 | Okuno | ................... | B23K 33/00 219/137 R |
| 5,655,368 A * | 8/1997 | Koike | .................... | F16H 45/02 192/208 |
| 8,327,636 B2 | 12/2012 | Karamavruc et al. | | |
| 8,789,669 B2 | 7/2014 | Karamavruc et al. | | |
| 2007/0137962 A1 * | 6/2007 | Sturgin | ................... | F16H 45/02 192/3.29 |
| 2009/0078522 A1 * | 3/2009 | Jung | ....................... | F16H 45/02 192/3.29 |
| 2010/0077743 A1 * | 4/2010 | Mori | ................... | F16D 25/0638 60/364 |
| 2017/0299031 A1 * | 10/2017 | Smith | ..................... | F16H 45/02 |

FOREIGN PATENT DOCUMENTS

FR           2797015 B1 *   3/2002     ............. F16H 45/02

* cited by examiner

*Primary Examiner* — Thomas E Lazo
(74) *Attorney, Agent, or Firm* — Davidson, Davidson & Kappel, LLC

(57) ABSTRACT

A torque converter is provided. The torque converter includes a front cover. The front cover includes a radially extending section and an axially extending section extending axially from an outer radial end of the radially extending section. The torque converter also includes a rear cover. The rear cover includes a rear radially extending section and a rear axially extending section extending axially from an outer radial end of the rear radially extending section. The torque converter also includes a plurality of baffles connected to the front cover. Each of the baffles includes a first tab connected to the axially extending section of the front cover. A method of forming a torque converter is also provided.

15 Claims, 4 Drawing Sheets

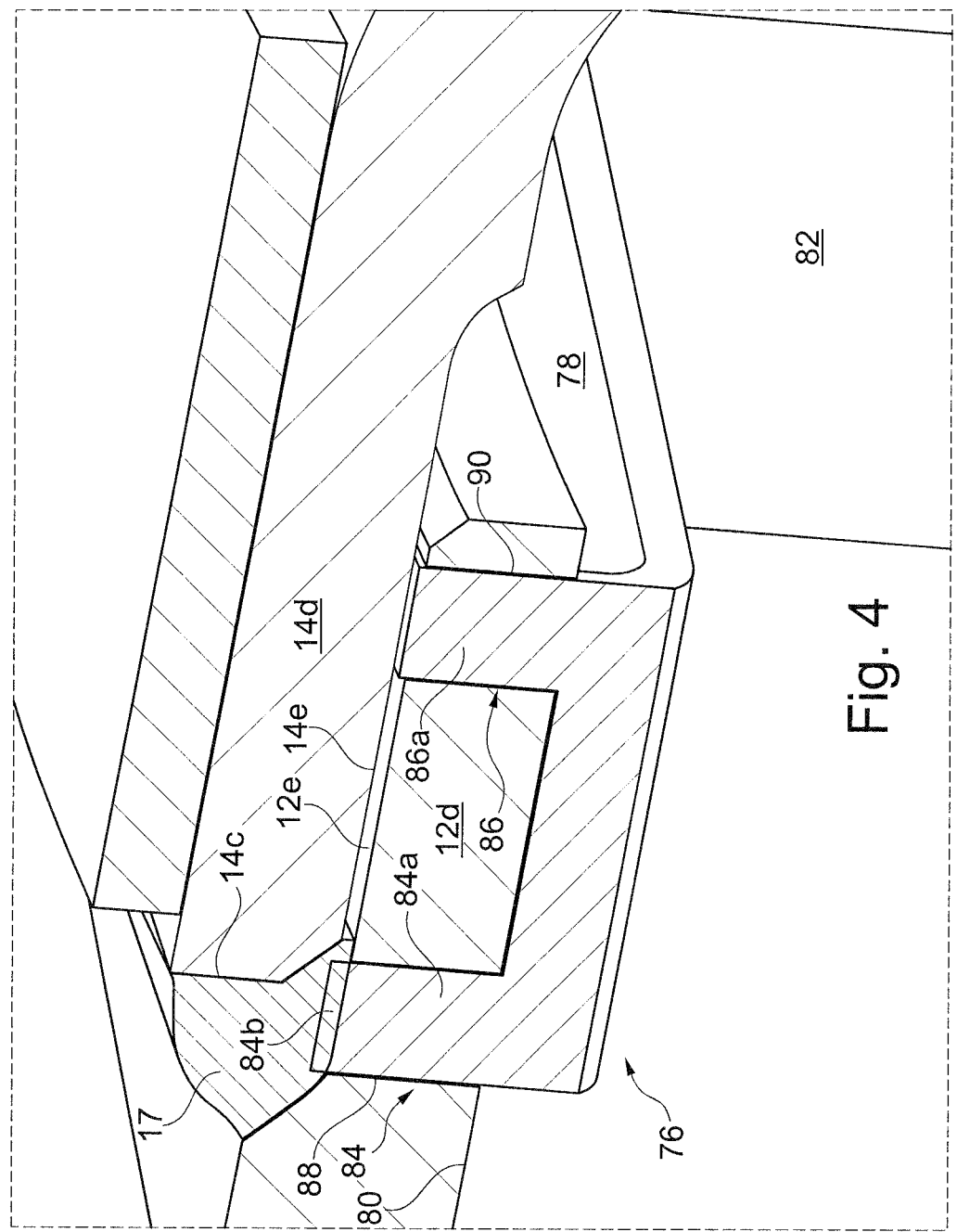

TORQUE CONVERTER INCLUDING FRONT COVER FLUID FLOW BAFFLES

The present disclosure relates generally to torque converters and more specifically to the fluid flow baffles in torque converters.

BACKGROUND

U.S. Pat. No. 8,327,636 discloses a torque converter including a front cover having blades for increasing a fluid flow toward or away from a clutch pack. U.S. Pat. No. 8,789,669 discloses torque converter drive plates that include at least one protrusion for disrupting a Coriolis Effect on fluid in the torque converter.

SUMMARY OF THE INVENTION

A torque converter is provided. The torque converter includes a front cover. The front cover includes a radially extending section and an axially extending section extending axially from an outer radial end of the radially extending section. The torque converter also includes a rear cover. The rear cover includes a rear radially extending section and a rear axially extending section extending axially from an outer radial end of the rear radially extending section. The torque converter also includes a plurality of baffles connected to the front cover. Each of the baffles includes a first tab connected to the axially extending section of the front cover.

A method of forming a torque converter is also provided. The method includes inserting first tabs of baffles through respective first slots in an axially extending section of the front cover; bending the first tabs to form circumferentially extending sections to connect the baffles to the front cover; and fixing the front cover and a rear cover together.

BRIEF DESCRIPTION OF THE DRAWINGS

The present invention is described below by reference to the following drawings, in which:

FIG. 4 shows a perspective cross-sectional view of torque converter at one of baffles after the front cover is welded to the rear cover.

DETAILED DESCRIPTION

The disclosure provides front cover baffles to improve response time after coast engagement in a torque converter. The baffles are individually stamped and each include having two protrusions to fit into holes in the cover. At least one of the two protrusions is bent to lock in place with the cover during subassembly. The closure weld subsequently covers over the tab roll to prevent leaks.

Figure 1:
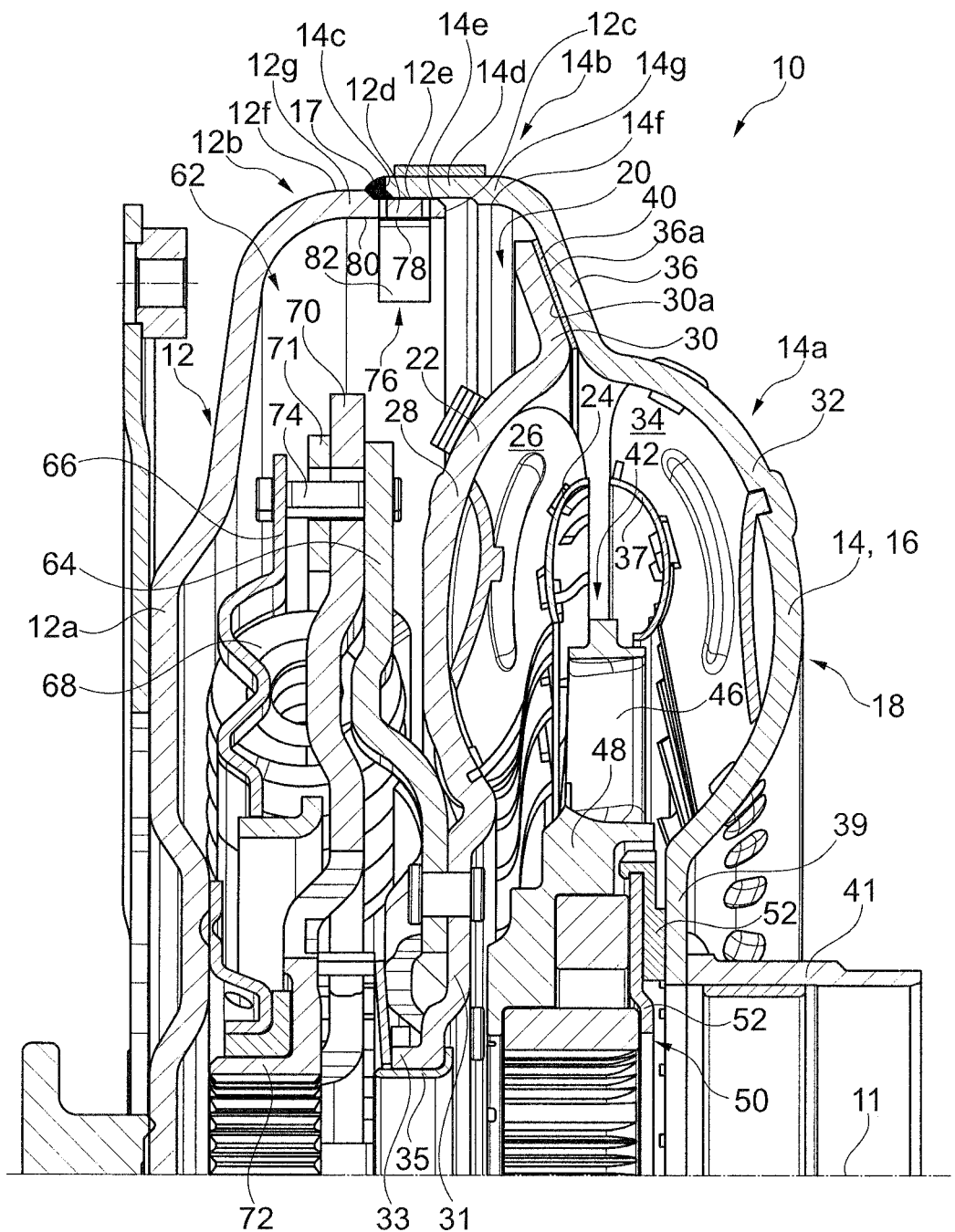
FIG. 1 shows a cross-sectional side view of a torque converter including baffles according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11.

Front cover 12 is substantially cup-shaped and includes a radially extending section 12a that intersects and extends radially away from center axis 11 and an annular axially extending section 12b that protrudes axially at an outer circumference of section 12a. Near a rim 12c of section 12b, section 12b is stepped radially inward to define a thinned section 12d having an outer circumferential surface 12e that is offset radially inward from an outer circumferential surface 12f of a remaining section, i.e., a thicker section 12g, of section 12b. Rear cover 14 is similarly cup-shaped and includes a radially extending section 14a that forms impeller shell 16 and an annular axially extending section 14b that protrudes axially at an outer circumference of radially extending section 14a. Near a rim 14c of section 14b, section 14b is stepped radially outward to define a thinned section 14d having an inner circumferential surface 14e that is offset radially outward from an inner circumferential surface 14f of a remaining section, i.e., a thicker section 14g, of section 14b. Covers 12, 14 are arranged with respect to each other such that sections 12d, 14d overlap each other, with section 12d being receiving inside of section 14d and outer circumferential surface 12e contacting inner circumferential surface 14e. A weld 17 is provided at rim 14c and outer circumferential surface 12e of thinned section 12d to fix front cover 12 and rear cover 14 together.

Torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16, at radially extending section 14a of rear cover 14, includes a rounded blade supporting portion 32, which is shaped as an annular bowl, for contacting transmission side edges of impeller blades 34. Radially outside of blade supporting portion 32, radially extending section 14a includes a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes a stator casting including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52.

A damper assembly 62 is positioned between front cover 12 and turbine 20 and is configured for transferring torque from turbine 20 to a transmission input shaft. Damper assembly 62 includes two cover plates—a turbine side cover plate 64, which is riveted to turbine 20, and a front cover side cover plate 66. Cover plates 64, 66 support a set of arc springs 68 axially therebetween. Damper assembly 62 also includes two drive flanges 70, 71 positioned axially between cover plate 64, 66. Drive flange 70 includes an inner radial hub 72 configured for nonrotatably connecting to a transmission input shaft. Drive flanges 70, 71 both includes circumferentially extending slots for receiving springs 68. Radially outside of springs 68, cover plates 64, 66 are fixed together by a plurality of circumferentially spaced rivets 74.

In accordance with an embodiment of the invention, torque converter 10 is provided with a plurality of circumferentially spaced baffles 76 connected to front cover 12. Baffles 76 each includes a circumferentially extending base 78 for contacting or extending adjacent to an inner circumferential surface 80 of axially extending section 12b of front cover 12 and a fluid flow impacting section in the form of a radially extending section 82 extending radially inward from base 78. Each baffle 76 includes at least one tab extending radially outward from base 78 for connecting the baffle 76 to axially extending section 12b of front cover 12.

Figure 2:
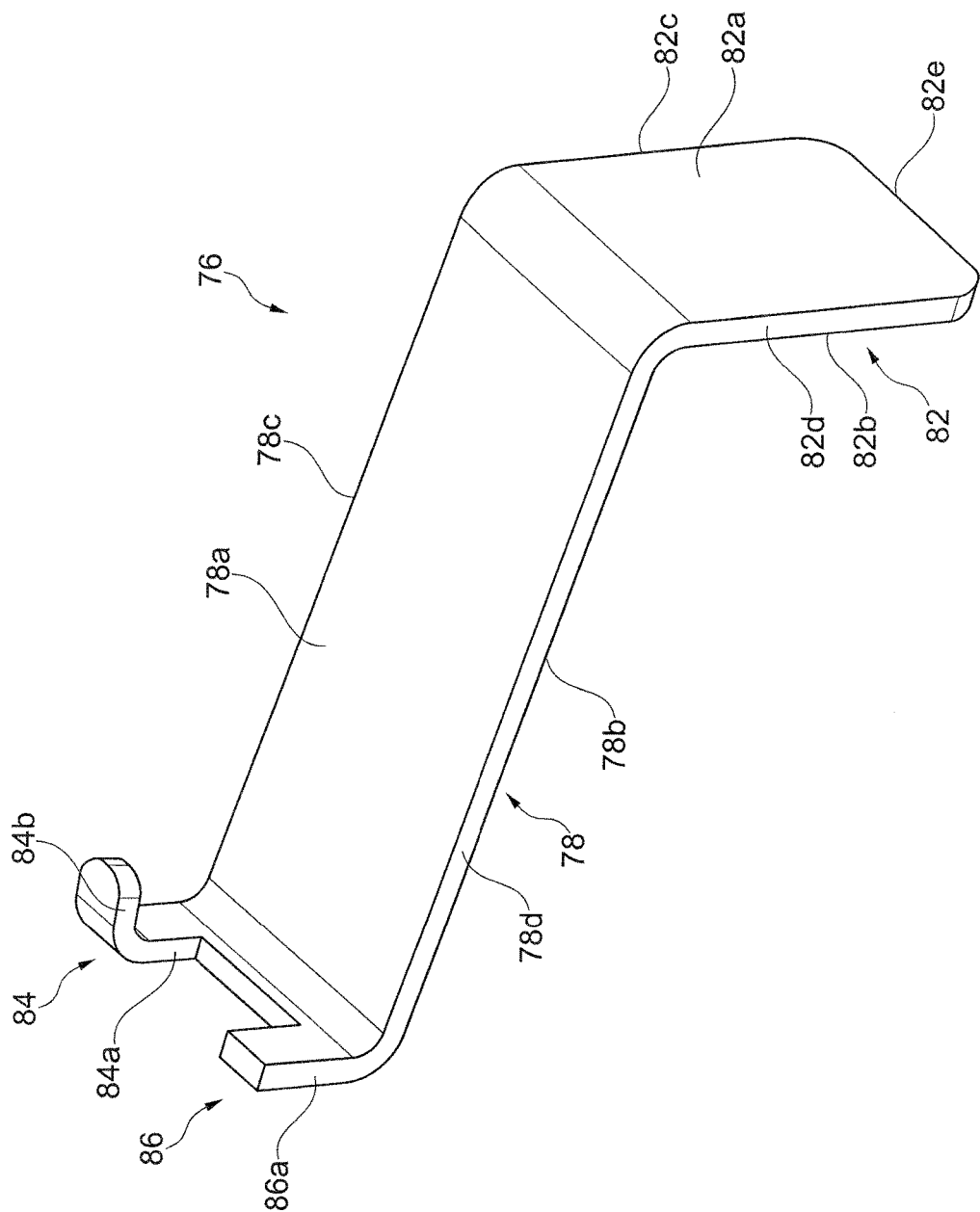
FIG. 2 shows a stand-alone perspective view of one of the baffles.

FIG. 2 shows a stand-alone perspective view of one of baffles 76. In the embodiment shown in FIG. 2, each baffle 76 includes two tabs 84, 86 extending radially outward from base 78. Base 78 and radially extending section 82 are both rectangular in shape, with base 78 extending perpendicular to radially extending section 82. Base 78 includes two flat planar faces 78a, 78b that are delimited and joined together by two side edges 78c, 78d. When assembled in torque converter 10 (FIG. 1), face 78a forms a radially outer face facing axially extending section 12b of front cover and face 78b forms a radially inner face facing center axis 11. At one end of base 78, tabs 84, 86 extend radially outward from base 78 at an angle approximately perpendicular to face 78a. Tab 84 extends radially outwardly from edge 78c and tab 86 extends radially outwardly from edge 78d. At the other end of base 78, opposite of the end that connects to tabs 84, 86, radially extending section 82 protrudes radially inward from base 78. Radially extending section 82 includes two flat planar radially extending faces 82a, 82b that are delimited and joined together by two side edges 82c, 82d and a radially inner edge 82e. Faces 82a, 82b face in opposite circumferential directions. Faces 82a, 82b transition into faces 78a, 78b, respectively, and edges 82c, 82d transition into edges 78c, 78d, respectively. Radially inner edge 82e extends axially between edges 82c, 82d.

Figure 3:
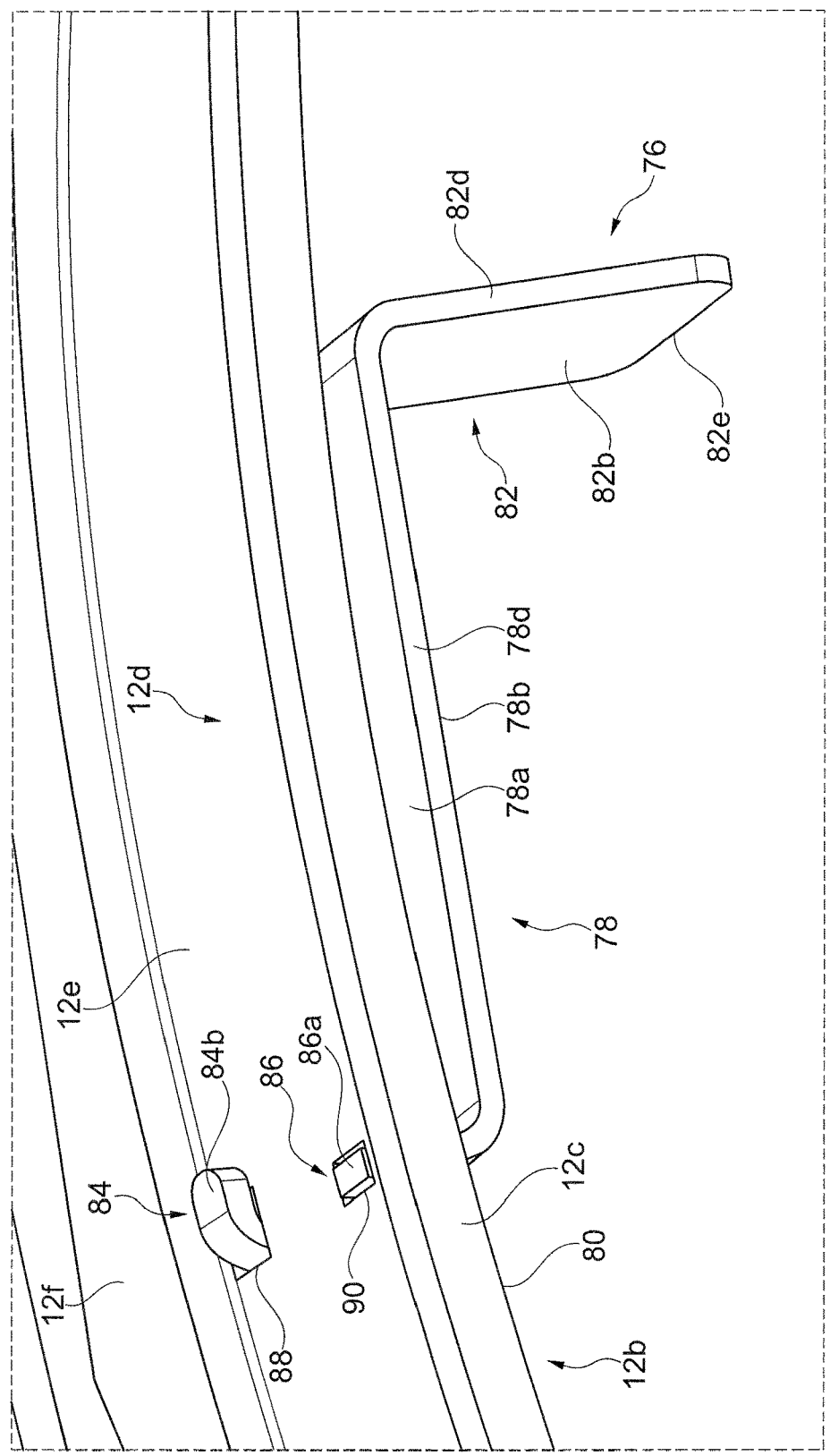
FIG. 3 shows a perspective view of one of the baffles being provided in axially extending section of a front cover of the torque converter before the front cover is welded to a rear cover of the torque converter.

Tab 84 includes a radially extending portion 84a extending in for extending in a first slot 88 (FIGS. 3, 4) and a circumferentially extending portion 84b extending from the radially outer end of portion 84a along outer circumferential surface 12e of a thinned section 12d (FIG. 3, 4). Circumferentially extending portion 84b is formed after tabs 84, 86 are inserted in respective slots, as discussed hereafter. Accordingly, before circumferentially extending portion 84b is formed, an entirety of tab 84 extends radially away from base 78. In this embodiment, tab 86 is shorter than tab 84 and solely includes a radially extending portion 86a. In other embodiments, tab 86 may also include a circumferentially extending portion.

FIG. 3 shows a perspective view of one of baffles 76 being provided in axially extending section 12b of front cover 12 before front cover 12 is welded to rear cover 14 by weld 17 (FIGS. 1, 4). In the embodiment shown in FIG. 3, tabs 84, 86 extend radially outward from base 78, each extending into a respective radially extending slot 88, 90 formed in axially extending section 12b. More specifically, slots 88, 90 are formed in thinned section 12d of axially extending section 12b, extending radially from inner circumferential surface 80 to outer circumferential surface 12e. Tab 84 includes a radially extending portion 84a (FIGS. 2, 4) extending in slot 88 and a circumferentially extending portion 84b extending from the radially outer end of portion 84a along outer circumferential surface 12e of a thinned section 12d. In the embodiment shown in FIG. 3, tab 86 extends only in slot 90 and does not protrude radially outer past outer circumferential surface 12e of thinned section 12d. Tabs 84, 86 are axially offset from each other, with tab 84 being axially closer to radially extending section 12a (FIG. 1) of front cover 12 than tab 86 and tab 86 being axially closer to rim 12c than tab 84.

FIG. 4 shows a perspective cross-sectional view of torque converter at one of baffles 76 after front cover 12 is welded to rear cover 14 by weld 17. Tab 84 is overlaid by weld 17, which contacts and surrounds circumferentially extending portion 84b of tab 84 and covers slot 88 such that torque converter fluid does not leak out of torque converter 10 via slot 88. Tab 86 and slot 90 are overlaid by inner circumferential surface 14e of thinned section 14d, which axially overlaps thinned section 12d. Weld 17 is joined to rim 14c and outer circumferential surface 12e. Slots 88, 90 extend entirely through thinned section 12d, passing from inner circumferential surface 80 to outer circumferential surface 12e.

A method of fixing baffles 76 to cover includes inserting tabs 84, 86 through respective slots 88, 90, then bending the tabs 84 with a rolling device to form circumferentially extending sections 84b to connect baffles 76 to front cover 12. Next, rear cover 14 is slid onto front cover 12 such that section 14d of rear cover 14 axially overlaps section 12d of front cover 12 and outer circumferential surface 12e contacts inner circumferential surface 14e. The overlap also results in slots 90 being covered by inner circumferential surface 14e. Rear cover 14 is then welded to front cover 12, with weld 17 being formed to fix covers 12, 14 together. Weld 17 covers circumferentially extending sections 84b of tabs 84 and slots 88.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a front cover, the front cover including a front radially extending section and an axially extending section extending axially from an outer radial end of the front radially extending section;
   a rear cover, the rear cover including a rear radially extending section and a rear axially extending section extending axially from an outer radial end of the rear radially extending section; and
   a plurality of baffles connected to the front cover, each of the baffles including a first tab connected to the axially extending section of the front cover, each of the baffles having a first end face and a second end face facing in opposite circumferential directions and two side edges delimiting and joining together the first and second end faces, each of the first end face and the second end face being wider than each of the two side edges.

2. The torque converter as recited in claim 1 further comprising a weld fixing the rear cover and front cover together, the weld covering the first tabs.

3. The torque converter as recited in claim 2 wherein each of the first tabs includes a circumferentially extending section contacting an outer circumferential surface of the axially extending section of the front cover.

4. The torque converter as recited in claim 1 wherein the axially extending section of the front cover includes a plurality of first slots extending radially therethrough, each of the first slots receiving one of the first tabs.

5. The torque converter as recited in claim 4 wherein a section of the axially extending section of the front cover axially overlaps a section of the axially extending section of the rear cover.

6. The torque converter as recited in claim 5 wherein each of the baffles includes a second tab, the axially extending section of the front cover including a plurality of second slots extending radially therethrough, each of the second slots receiving one of the second tabs, the section of the rear axially extending section cover the second slots.

7. The torque converter as recited in claim 1 wherein each of the baffles includes a radially extending section extending radially inward toward a center axis of the torque converter.

8. The torque converter as recited in claim 7 wherein each of the baffles further includes a base section, each of the first tabs extending radially outward from the respective base section, each of the radially extending sections extending radially inward from the respective base section.

9. A method of forming a torque converter comprising:
   inserting first tabs of baffles through respective first slots in an axially extending section of a front cover;
   bending the first tabs to form circumferentially extending sections to connect the baffles to the front cover; and
   fixing the front cover and a rear cover together.

10. The method as recited in claim 9 further comprising sliding the rear cover onto the front cover before fixing the front cover and the rear cover together such that a section of an axially extending section of the front cover overlaps with a section of an axially extending section of the rear cover.

11. The method as recited in claim 10 wherein each of the baffles includes a second tab, the method further comprising the inserting the second tabs of baffles through respective second slots in the axially extending section of the front cover, the sliding the rear cover onto the front cover including covering the second slots with the section of the axially extending section of the rear cover.

12. The method as recited in claim 9 wherein the fixing the front cover and the rear cover together including welding the rear cover to the front cover so as to form a weld cover the first tabs and the first slots.

13. The method as recited in claim 9 wherein each of the baffles includes a radially extending section extending radially inward toward a center axis of the torque converter after the baffles are connected to the front cover.

14. The method as recited in claim 13 wherein each of the baffles further includes a base section, each of the first tabs extending radially outward from the respective base section, each of the radially extending sections extending radially inward from the respective base section after the baffles are connected to the front cover.

15. A torque converter comprising:
   a front cover, the front cover including a front radially extending section and a axially extending section extending axially from an outer radial end of the front radially extending section;
   a rear cover, the rear cover including a rear radially extending section and a rear axially extending section extending axially from an outer radial end of the rear radially extending section; and
   a plurality of baffles connected to the front cover, each of the baffles including a first tab connected to the axially extending section of the front cover,
   wherein each of the baffles includes a radially extending section extending radially inward toward a center axis of the torque converter,
   wherein each of the baffles further includes a base section, each of the first tabs extending radially outward from the respective base section, each of the radially extending sections extending radially inward from the respective base section.

* * * * *